July 9, 1957            J. M. WALTER            2,798,773

COMPENSATED ADJUSTMENT MECHANISM FOR MACHINE TOOL SPINDLES

Filed July 6, 1954            4 Sheets-Sheet 1

INVENTOR.
John M. Walter.
BY Wood, Herron & Evans.
ATTORNEYS.

July 9, 1957  J. M. WALTER  2,798,773
COMPENSATED ADJUSTMENT MECHANISM FOR MACHINE TOOL SPINDLES
Filed July 6, 1954  4 Sheets-Sheet 2
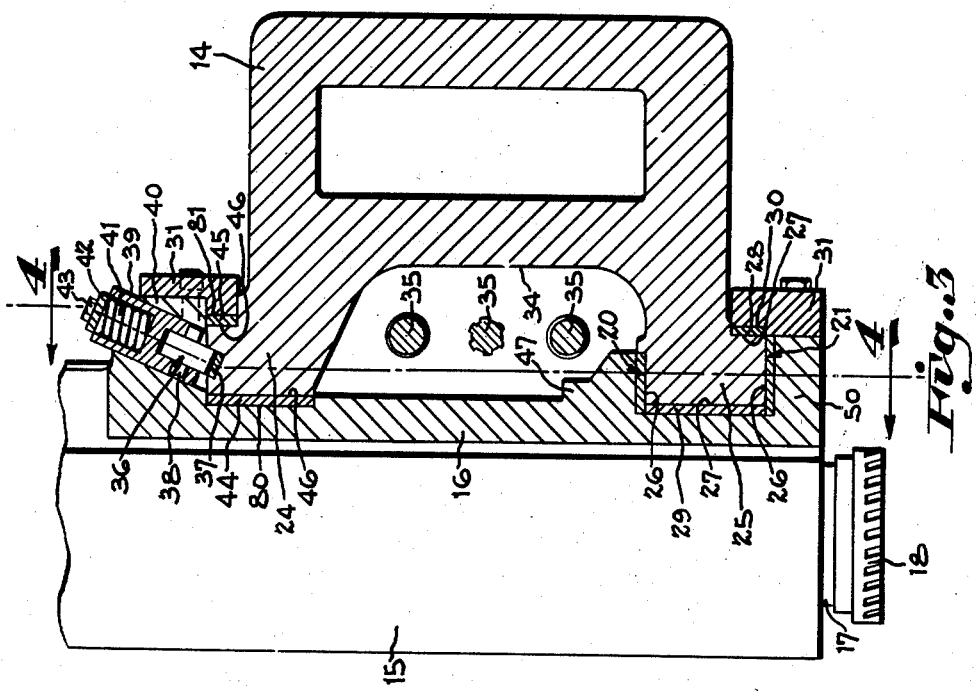
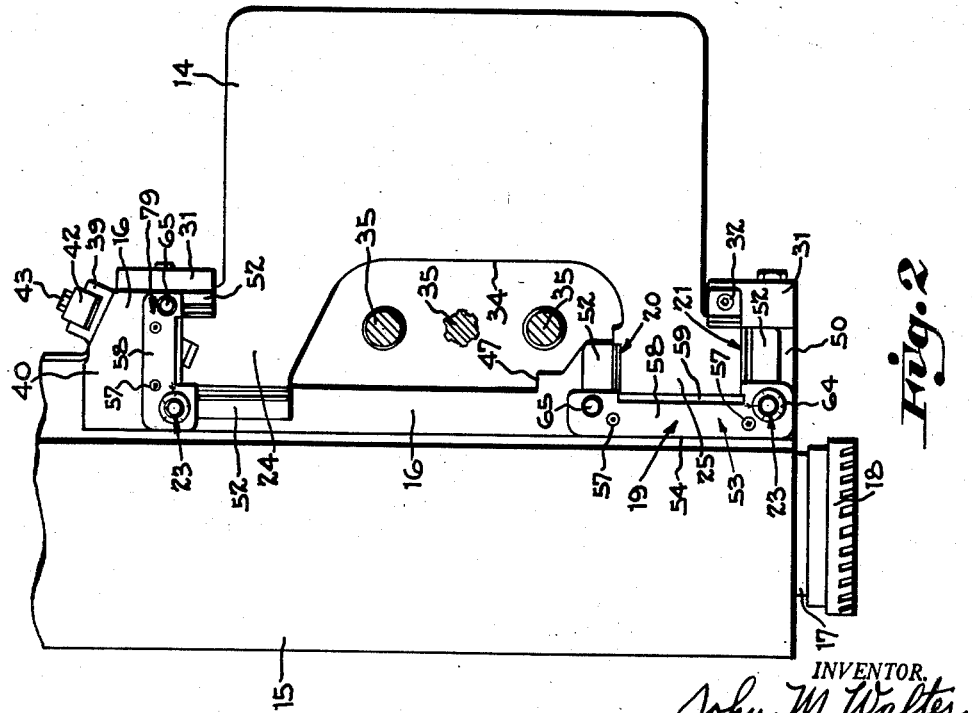
INVENTOR.
John M. Walter.
BY
Wood, Herron & Evans.
ATTORNEYS.

INVENTOR.
John M. Walter.
BY Wood, Herron & Evans.
ATTORNEYS.

July 9, 1957     J. M. WALTER     2,798,773
COMPENSATED ADJUSTMENT MECHANISM FOR MACHINE TOOL SPINDLES
Filed July 6, 1954     4 Sheets-Sheet 4
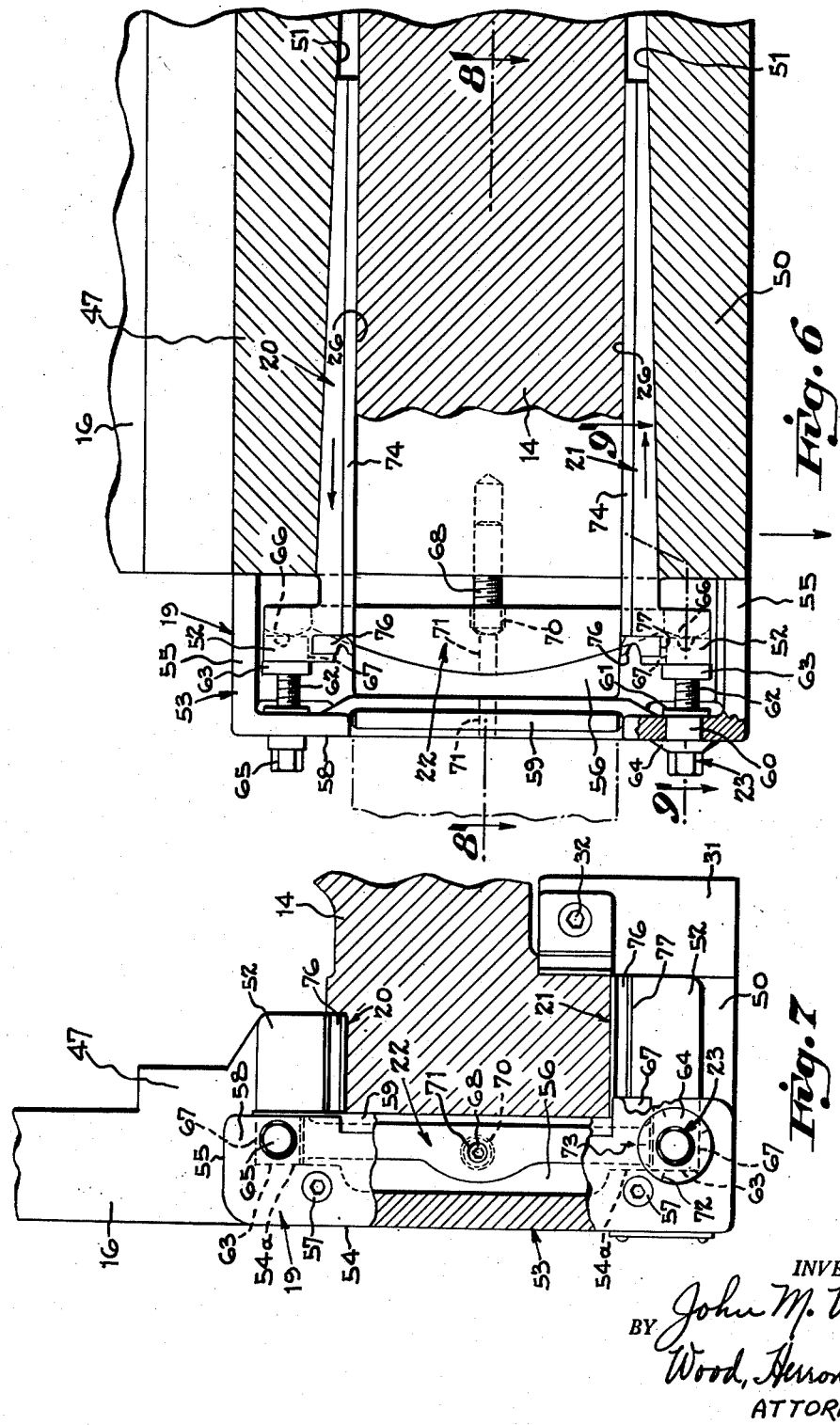
INVENTOR.
BY John M. Walter.
Wood, Herron & Evans.
ATTORNEYS.

United States Patent Office 2,798,773
Patented July 9, 1957

2,798,773

COMPENSATED ADJUSTMENT MECHANISM FOR MACHINE TOOL SPINDLES

John M. Walter, Cincinnati, Ohio, assignor to The G. A. Gray Company, Cincinnati, Ohio, a corporation of Ohio Application July 6, 1954, Serial No. 441,430

8 Claims. (Cl. 308—3)

This invention relates to machine tools such as milling machines, planer-type milling machines and the like, embodying a rotary cutting tool and a work-supporting table adapted to be fed progressively past the cutting tool.

The principal objective of the present invention has been to provide a simple, inexpensive structure through which minor adjustments conveniently may be effected in the angular disposition of the axis of rotation of the rotary cutting tool with respect to the work table. In order that the purpose of this invention fully may be appreciated, it is appropriate to consider briefly the problem to which the invention is addressed.

In a typical milling machine or planer miller, the work table is moved, on a bed, in a linear direction, and the rotating milling cutter is mounted upon a spindle which resides at right angles to a work-supporting surface of the table. So long as the angular disposition of the cutter axis resides precisely at 90° with respect to the work-supporting surface of the table, and particularly with respect to the path of movement of the work-supporting surface, throughout the entire circle of revolution of the spindle, then the plane of revolution, delineated by any given tooth of the milling cutter, will be precisely parallel with the work plane. If successive cuts are made across a workpiece through relative movement of the tool and work surface along a path which is parallel to the plane of rotation of the tool then the different cuts will generate a flat overall surface.

If the axis of tool rotation is not at 90° to the work table throughout the entire circle of revolution of the cutter, but is in fact tilted even slightly, say, for example, in a plane transverse the path of table movement, then the cutter will cut into the work more deeply at one side of its circle of revolution, and less deeply at the other. Now if a successive cut, adjacent but partially overlapping the first, is taken on the same workpiece, it is apparent that a groove or shoulder will be left at the area of overlap, since the high side of the cutter now occupies a position corresponding to the position which the low side of the cutter occupied in the previous cut. The two cuts, therefore, will not be flush with one another or coextensive in the same plane, as intended, and the machine surface will be less than perfect to the extent to which the groove effect is manifest. This imperfect matching of successive adjacent cuts in a milling operation will depend upon the degree to which the tool spindle is out of alignment with respect to the 90° disposition which is intended.

Misalignment may occur in the original manufacture or assembly of the machine, although this is not likely with modern methods of precision. More frequently, angular misalignment occurs during use through uneven wear, or, even in the course of a single day, through uneven temperature variations in the machine frame or housing. For example, the spindle of a planer-type miller may be mounted in appropriate slide apparatus carried by side columns or housings which are 15 or 20 feet in height, or more. If one of these side columns is exposed to greater heat than the other, it will expand more, thereby causing one side of the slide to be lifted more than the other, effecting a corresponding tilt in the associated spindle axis. Such conditions, for example, may occur if sunshine through a sky light falls upon one side of the machine and not the other, or through unequally distributed hot air for heating in the winter time. Since a milling cutter in a large, modern planer-type milling machine might be 12 to 15 inches or more in diameter, it is apparent that only a slight angular misalignment of the cutter axis may cause one side of the cutter to cut more deeply than the other by several thousandths of an inch or more.

Similarly, if the tool spindle is angularly tilted in the direction of movement of the table, the toe of the cutter will cut deeper than the heel, or vice versa, and the machined trace of the tool will appear as a longitudinal groove, slightly arcuate in cross section, as generated by the cutter circularity, rather than flat as intended. It may actually be desirable, in roughing operations, to tilt the tool axis in the longitudinal direction, so that the teeth in the toe of the cutter do the work, while the heel clears the machined surface so as to avoid chip drag; but for finishing cuts, such a condition will not produce the desired flatness of surface.

A milling cutter, when machining metal, leaves a visual trace of its revolution in the form of annular scratches, caused perhaps by chips or tooth roughness. These are always visible, more or less, depending on the depth of cut and the perfection of the tool. The practical machinist knows that when the scratches left in the work by the tool when the tool is caused to cut overlapping paths, are of equal intensity in the area of overlap, and present an "engine turned" pattern, then the tool spindle is located in proper position.

In accordance with the present invention, tool axis is adjusted from a position of misalignment to a proper position, by means of cooperating gibs. These elements, in the simplest form, may be elongated tapered members which bar against complementary tapered surfaces of a support and some movable part, carried by the support and mounting the spindle. By shifting one of the tapered gibs in one direction, and the other in an opposite direction, the part between the gibs is shifted bodily through an angular path. However, it is a time consuming operation to shift gibs individually, inasmuch as if one is moved a greater linear distance (assuming the tapers are equal) then the spacing across the gib faces will either be increased or decreased, and the movable member will thereby either be mounted too tightly or too loosely upon its support.

This invention contemplates a simple structure wherein gib members, tapered longitudinally in the same direction, are cross-connected, for example, through a rocker arm or bridge which is pivotally mounted in between them. Movement of one end of this rocker arm, therefore, is accompanied by movement of the opposite end in an opposite direction, and, assuming that the fulcrum point is midway between the points of interconnection of the rocker arm with the gibs, the movements will be equal in extent. Thereby the desired angular shiftability is obtained without disturbing the desired fitting of the gibs with the support surfaces against which they bear.

This principle of construction is adapted for use between a relatively fixed member and a relatively movable member, slidable thereon at any part or portion of the machine wherein misalignment may occur. For example, in a planer-type milling machine, the structure may be used between the head saddle and the rail upon which the saddle is mounted to accommodate axial misalignment in directions transversely of the path of table movement. If desired, a similar mechanism may be located between the saddle and rail in a position to accommodate axial misalignment longitudinally of the path of table movement, or to tilt the tool axis in the longitudinal direction for roughing operations, as noted earlier. The arrangement similarly may be employed in side milling heads for the same purpose.

A typical mechanism, utilizing the principles of the invention, is disclosed in the following detailed description, taken in conjunction with the drawings.

In the drawings:

Figure 2 is an end view taken along line 2—2 of Figure 1, showing the relationship of the external actuating parts of the adjustment mechanism.

Figure 3 is a cross sectional view taken on line 3—3 of Figure 1, showing the internal arrangement of the tapered gibs of the adjusting mechanism relative to the saddle and rail.

Figure 6 is an enlarged fragmentary sectional view taken from Figure 4, further detailing the rocker arm mechanism for shifting the gibs simultaneously in opposite directions.

Figure 7 is an end view projected from Figure 6, further illustrating the gib actuating mechanism.

Figure 1:
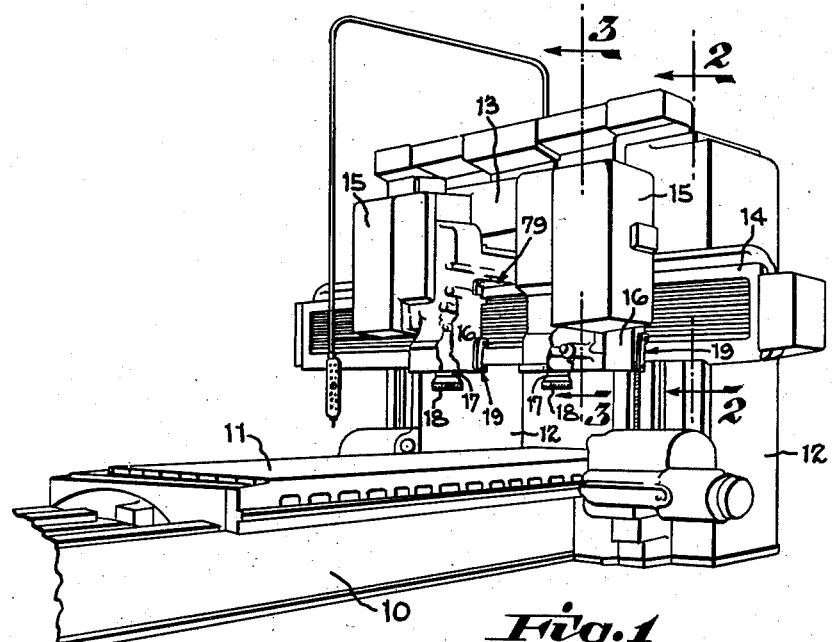
Figure 1 is a fragmentary perspective view of a milling machine having milling heads mounted upon a cross rail and utilizing the present adjusting mechanism to position the spindles of the heads in perpendicular alignment with the plane of the table.

Referring to the drawings, the machine disclosed in Figure 1 represents a planer-type milling machine which has been selected to illustrate the utility of the present invention. It will be understood from the following description that the adjustment mechanism is intended for machine tools of all kinds having a spindle or spindles which must be related axially at a precise angle to the plane of the work surface.

As shown in Figure 1, the milling machine includes a bed 10 upon which is mounted a table 11 which supports the work to be milled. The bed is provided with suitable ways which guide the table for longitudinal movement upon the bed, the table being reciprocated lineally in feeding and traverse movements by a power mechanism (not shown). One end of the bed is provided with a pair of vertical columns or housings 12—12 bolted to the opposite sides of the bed and rising a substantial distance above it. The housings are braced by a cross member 13 extending transversely across and above the bed having opposite ends secured rigidly to the upper ends of the housings. A rail 14 extends transversely across the table below the cross member and its opposite ends are supported by the housings 12 for vertical adjustment relative to the table surface to compensate for the height of the workpiece to be milled.

In the present machine, the rail 14 is provided with two milling heads 15—15, each carried by a respective saddle 16 which is slidably mounted upon the rail. The rail is provided with ways, as described later, slidably engaging the saddles and adapting the saddles and milling heads to be shifted transversely along the rail. Each head 15 includes a tool spindle 17, a spindle motor, and a gear train connecting the motor to the spindle for rotating the spindle at the required speed. The head details form no part of this invention and have been omitted from the disclosure.

A face milling cutter 18 is mounted upon the lower end of spindle 17 for finishing the surface of the workpiece. The compensated adjustment mechanism is applied to the saddle 16, as indicated generally at 19 in Figure 2, and is utilized to adjust the saddle (and axis of the spindle) with respect to the rail 14 in a plane which is transverse to the line of motion of the table, thereby to adjust the spindle precisely to a 90° angle relative to the plane of the table. In the machine disclosed, the adjustment mechanism is applied to the saddle of each milling head, making them individually adjustable; therefore the following description of one of the heads and associated parts applies to both.

During a milling operation, the workpiece carried by the table 11 is fed lineally relative to the rotating cutter 18, thus machining upon the work surface a finish cut having a width equal to the diameter of the cutter. Upon completion of the cut, the table is moved at a traverse rate back to the starting position and the head is shifted transversely along the rail a sufficient distance to bring the cutter into overlapping relationship with the cut previously made. The table is then fed longitudinally for the next successive cut which, because of the transverse shift of the head, is machined adjacent and partially overlapping the first cut. This procedure is repeated until the entire surface is finished.

Since the finished surface is produced by the face of the rotating milling cutter acting upon the lineally moving work surface, a pattern is generated consisting of very fine, generally circular scratches, which are microscopic in depth, but which are plainly visible because of the light reflecting character of the finished surface. These minute scratches form an engine turned pattern if the axis of rotation of the spindle and cutter is precisely perpendicular to the plane of the table and work surface.

If the axis of rotation of the cutter is not precisely at 90° to the plane of the work table, but is tilted even slightly from the perpendicular in a plane transverse to the path of table movement, then the cutter will machine overlapping cuts which are not truly flush with one another. In other words, the rail 14 will guide the head transversely in a path parallel to the table, but the surface of each cut will be inclined slightly in the direction of tilt instead of being coextensive in a common plane. Obviously, this will produce a shoulder along the line of juncture of the high and low sides of each cut, the depth of the shoulder depending upon the degree of misalignment of the spindle.

The compensated adjustment mechanism 19 is utilized to adjust the slide relative to the rail in micrometer fashion and without changing the sliding fit of the saddle with respect to the rail. In a great many machines, a single adjustment mechanism 19 is utilized at one end only of the slide or movable member to effect the necessary adjustments. In this event, conventional gibs are mounted at the opposite end to support the saddle for rocking motion upon the rail during resetting of the adjustment mechanism.

Figure 4:
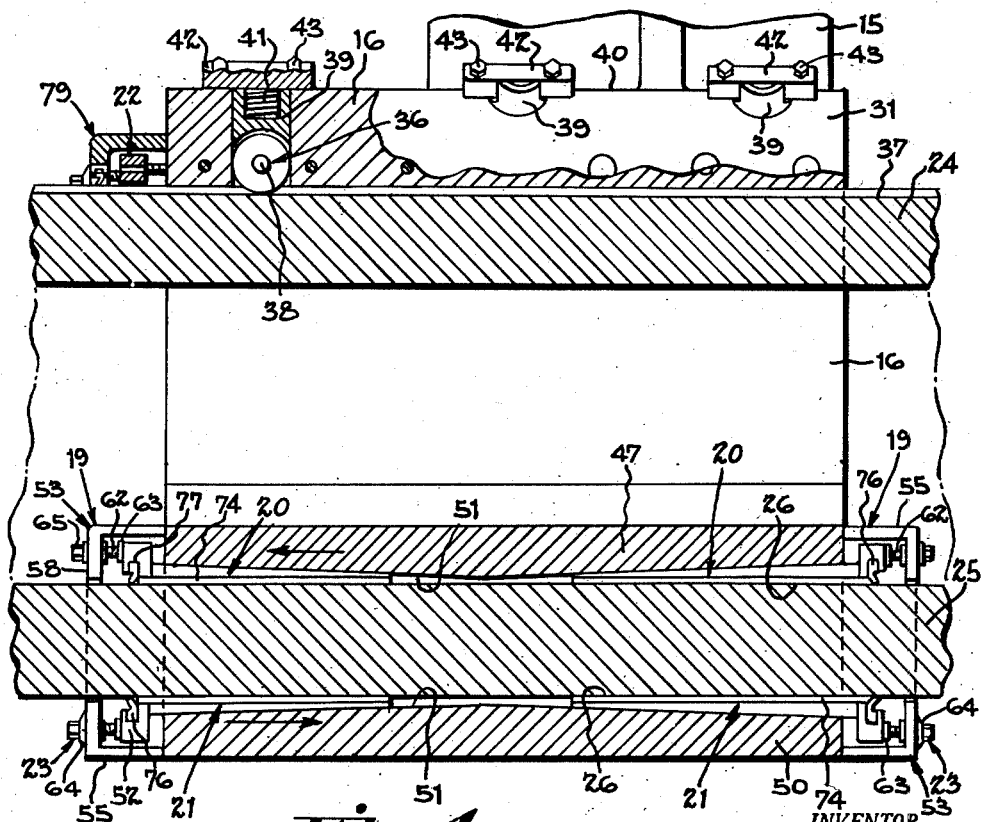
Figure 4 is a longitudinal sectional view take on line 4—4 of Figure 3, showing the longitudinal arrangement of the gibs and adjusting mechanism relative to the saddle. In this view the mechanism is shown at both ends of the saddle to provide a maximum range of adjustment; however, the mechanism is utilized at one end only in many instances.

In the embodiment shown in Figure 4, a respective adjustment mechanism is shown at both ends of the saddle, illustrating an arrangement which is utilized in cases which require a greater range of adjustment. It will be understood the principle is identical whether the mechanism is mounted at one or both ends and that the following description applies equally to the single or double arrangement.

Referring to Figure 4, each adjustment mechanism includes an upper taper gib, indicated generally at 20 and a lower gib indicated generally at 21. The two gibs of each pair are interconnected with one another for simultaneous adjustment in opposite directions by means of the fulcrumed rocking arm or bridge, indicated generally at 22. Each pair of gibs is adjusted in a simple manner by means of the micrometer adjustment nut indicated generally at 23, as described later.

Described with reference to Figure 3 the rail 14 comprises a rigid box section having an upper guideway 24 and a lower guideway 25. The lower guideway provides upper and lower bearing surfaces 26—26 and the two side bearing surfaces 27—27. The lower portion of the saddle is stabilized laterally upon the rail by a side gib 28 engaging one of the side bearing surfaces 27 and a bearing plate 29 engaging the opposite surface 27. The gib 28 slides in a bearing surface 30 which is formed in a rail 31 attached to the saddle. The bearing surface has a taper corresponding to the taper of the gib, such that the gib bearing surface is parallel with the side bearing surface 27. The side bearing gib is adjusted in a conventional manner by means of a screw 32 which is threaded into the end of the saddle to shift the gib in the required direction relative to the saddle.

The portion of the arm intermediate the upper and lower guides 24 and 25 is recessed longitudinally as at 34 to provide clearance for the shafts indicated at 35. These shafts are utilized in manipulating the heads but form no part of the present invention.

In order to inhibit wearing of the upper and lower gibs 20 and 21, the weight load of the head and saddle is counter-balanced by a plurality of spring loaded rollers indicated generally at 36. The rollers are mounted in the upper portion of the saddle and track upon a groove 37 formed in the top surface of the upper guideway 24 of the arm. As shown in Figure 4, a set of three counterbalanced rollers carry the weight load of the saddle and allow it to be adjusted angularly relative to the rail upon adjustment of the compensating mechanism at either end of the saddle as explained later.

As best shown in Figure 3, each roller 36 is journalled as at 38 in a plunger 39 slidably mounted in a bore formed in the overhanging top portion 40 of the saddle. A compression spring 41 resides in a bore formed in plunger 39 and has its opposite end seated against a cap 42 which is bolted as at 43 to the top surface of the saddle (Figure 4). The rollers 36 are of the antifriction ball bearing type and provide a smooth sliding saddle motion and relieve the adjustment gibs 20 and 21 of the weight load they would otherwise bear so as to prolong the accurate life of the adjustment mechanism.

The upper end of the saddle is stabilized laterally upon the rail by a pair of adjustable gibs 44 and 45 which bear against the side bearing surfaces 46—46 of the upper guideway 24. These gibs may be individually adjustable but in the present disclosure form a part of a second compensated adjustment mechanism, as explained later.

Referring again to Figure 3, it will be noted that the saddle in cross section is generally channel shaped, providing the top portion 40 including a second retainer rail 31 which overhangs the upper guideway 24. The saddle further includes an intermediate bearing flange 47 which overhangs the top surface of the lower guideway 25 and a bottom flange 50 which carries the rail 31. The upper and lower gibs 20 and 21 at each end of the saddle are slidably mounted in respective tapered grooves 51—51 (Figure 4) which are machined in the surface of the intermediate and lower bearing flanges facing the bearing surfaces of the lower rail. The taper of these grooves corresponds to the taper of the gibs, bringing the bearing surfaces of the gibs into parallelism with the rail bearing surfaces 26—26.

As noted earlier, the adjustment mechanism 19 may be duplicated at opposite ends of the saddle (Figure 4); however, the following description applies to a single structure which may be located at either end. As best shown in Figures 6 and 7, the upper and lower gibs are each provided with a lateral flange 52, the flange of the upper gib projecting upwardly and the flange for the lower gib projecting downwardly. The flanges of the gibs reside within a box-like housing 53 having a forward wall 54, a pair of end walls 55—55 and an open side indicated at 56. The housing is attached to the end of the saddle by means of the screws 57—57 passing through the face wall 58 of the housing into the saddle.

Figure 9:
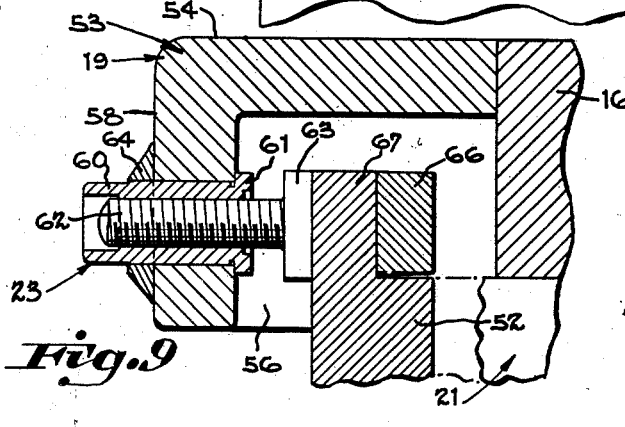
Figure 9 is a fragmentary sectional view taken on line 9—9 of Figure 6, detailing the micrometer adjustment nut and its connection to the lower gib.

The micrometer nut 23 comprises a sleeve 60 passing through wall 58 and having a flange 61 in bearing engagement against the inner surface of the wall 58 (Figure 9). A non-rotatable screw 62 is threaded through the sleeve and nut and is provided with a foot 63 seated against the surface of flange 52 of the lower gib. The screw is locked against rotation by engagement of one side of its foot 63 against the finished bearing surface 54a of wall 54 as shown in Figure 7. A micrometer dial 64 is attached to nut 23 to register the adjustment.

A similar nut, which is indicated at 65 is rotatably mounted in the upper portion of wall 58 and includes a similar screw 62 having a foot engaged against the flange of the upper gib and locked against rotation by the bearing surface 54a. The upper and lower gibs are connected together for simultaneous movement in opposite directions by the rocker arm 22 which is provided with rounded outer ends 66 bearing against the surface of the respective lugs 67 which project laterally from the flanges 52. A fulcrum screw 68 is threaded into the end of the saddle and includes a rounded outer end which is in bearing engagement with the center of the rocker arm which is provided with a bore 70 to receive the end portion of the screw. The outer end of the fulcrum screw is provided with a socket, and the wall 58 and rocker arm are provided with coaxial bores 71 open to the socket to allow the screw to be adjusted by passing a conventional socket wrench through the bores 71 into the socket of the screw.

At assembly, the lower and upper adjustment nuts 23 and 65 are rotated to shift the gibs in the directions required to bring the head and spindle to a perpendicular position. When the proper running fit is obtained, with the head truly perpendicular, the fulcrum screw is backed out, if necessary, to force the ends of the rocker arm into engagement with the lugs 67 of the gibs. This takes up any looseness in the interconnection between the two gibs and preloads the adjusting screws sufficiently to lock them in their adjusted position.

If the spindle becomes misaligned after prolonged service or by reason of temporary temperature changes, precise alignment is re-established without changing the fit of the gibs upon the rail by adjusting the nuts 23 and 65 at one end of the saddle. As indicated earlier, the lower micrometer adjustment nut 23 is provided with a dial 64, having graduations 72 and a reference point 73. The graduations provide a micrometer action, indicating for example, a relative saddle motion of .0001 per foot for each graduation.

In making the adjustment, the upper nut 65 is loosened, spindle alignment relative to the plane of the table is checked by the use of suitable instruments, then the lower nut rotated in the indicated direction for a sufficient number of graduations to obtain precise alignment. Thereafter, the upper nut 65 is tightened to preload the gibs and establish the precise running fit previously obtained.

It will be seen, with reference to the arrows of Figure 6, that if the adjustment requires the end of the saddle to be lowered, then the micrometer nut 23 is rotated in the direction to force the lower gib inwardly as indicated. This motion concurrently is imparted by the rocker arm to the upper gib in the opposite direction, thus shifting the saddle in the desired direction. When the upper nut 65 is thereafter tightened to preload the gibs, any existing looseness is taken up and the parts are locked in adjustment.

If, on the contrary, the measuring instruments indicate that the end of the saddle should be raised, the nut 65 is first loosened, then the micrometer nut is rotated in the opposite direction. However, when the micrometer nut is rotated in the raising direction, the foot 63 backs away from the lower gib, leaving the gib in its former position. When the nut 65 is thereafter tightened, the upper gib 20 is forced inwardly and the lower gib 21 is shifted by the rocker arm outwardly to raise the end of the saddle, thus preloading both gibs against the feet 63 of the adjustment screws.

As explained earlier, the counterbalance rollers 36, by operation of the springs, allow the saddle to yield during adjustment of the gibs. It will also be understood that the saddle rocks relative to the gibs at its opposite end during adjustment and that these gibs need not be disturbed to make the adjustment. If both ends of the saddle are equippend with the compensated adjustment mechanism, the above procedure is followed at either end or at both ends if the design of the particular machine tool so requires.

Figure 8:
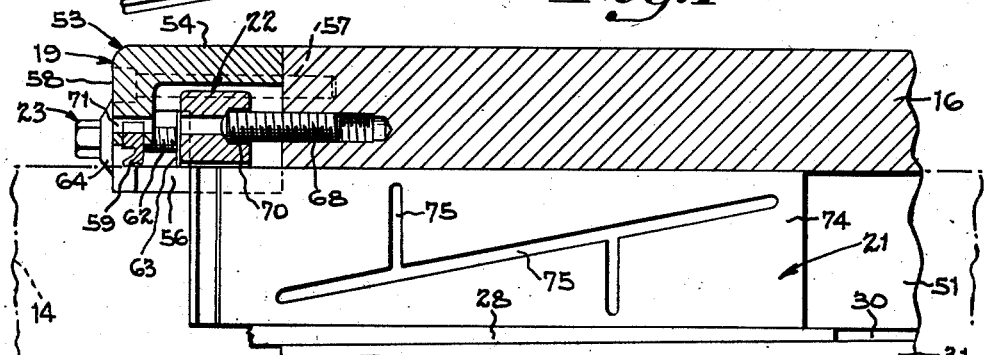
Figure 8 is a fragmentary sectional view taken on line 8—8 of Figure 6, detailing the fulcrum screw mounting of the rocker arm, the rail being indicated in broken lines.

In the preferred structure, the gibs are provided with non-metallic bearing strips 74 which engage the bearing surfaces of the arm. These strips have better wear resisting qualities than metal and preserve the accuracy of adjustment almost indefinitely; moreover, they may be adjusted to a snug running fit without excessive friction or danger of scoring. The strips preferably are provided with oil distribution grooves 75 upon their bearing surfaces as best indicated in Figure 8. In addition, each gib is provided with a wiper strip 76 seated in a slot 77; these wipers slidably engage the bearing surfaces of the arm to prevent loss of lubricant and to wipe the bearing surfaces clean of foreign matter as the saddle is advanced along the arm. As shown in Figure 8, the edge of the face wall 58 is slotted to receive a similar wiper 59, which engages the side bearing surface 27 of the rail.

Figure 5:
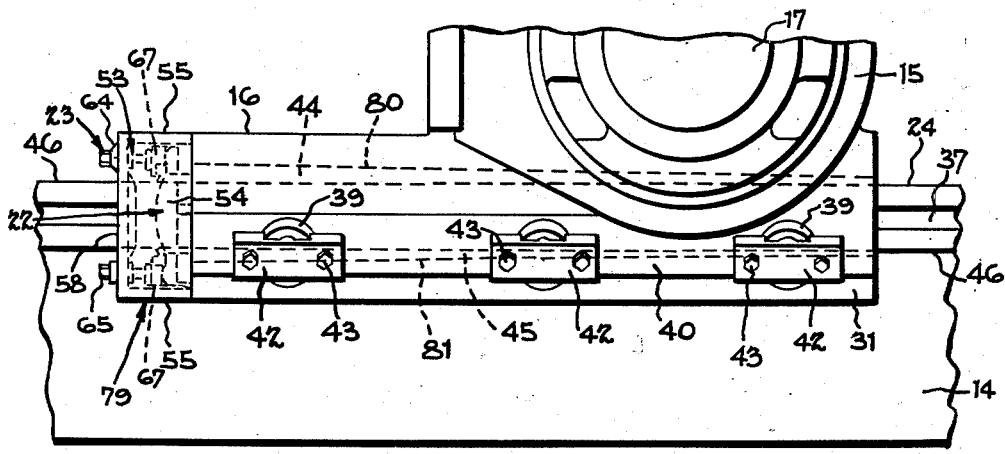
Figure 5 is a top plan view projected from Figure 4, further illustrating the general arrangement of the milling head and rail and showing a similar adjustment mechanism located at the top of the saddle for adjusting the axial alignment of the spindle in a plane longitudinal to the path of table movement.

As noted earlier, the upper portion of the saddle is stabilized transversely upon the rail by the gibs 44 and 45 bearing against the opposite sides of the upper guideway 24 as shown in Figure 5. In the present disclosure, these gibs are actuated in unison and in opposite directions by an adjustment mechanism indicated generally at 79 which is similar to the mechanism described above. The mechanism 79 utilizes the two gibs previously indicated at 44 and 45, which extend for the full length of the saddle. The gib 44 is slidably mounted in a channel 80 milled in the surface of the saddle, as indicated in Figure 3, and engages the side bearing surface 46. The gib 45 is slidably confined between rail 31 and the opposite side bearing surface 46. It will be noted in Figure 5 that the channel 80 of gib 44 is tapered longitudinally to the same degree as the gib, with the bearing surface of gib lying parallel with the surface 46 of the rail which it engages. The surface 81 of rail 31, which confines gib 45, is similarly tapered, such that the bearing surfaces of both gibs are parallel with the side bearing surfaces 46—46.

Since the other parts of the structure substantially duplicate the parts previously described, the same reference numbers are applied to them. It will be noted in Figure 5, that the gibs 44 and 45 are provided with lateral flanges 52—52 which project outwardly in opposite directions similar to the gibs 20 and 21. The gibs are shifted simultaneously in opposite directions by a rocker arm 22 having opposite ends in bearing engagement with the lugs 67 as described previously. A housing 53 is attached to the end of the saddle and includes a micrometer adjustment nut 23 and an adjustment nut 65 at opposite ends of the housing for actuating the rocker arm. The actuating mechanism in all respects is a duplicate of the structure at the lower portion of the saddle; however, the rocker arm and housing are reduced in length to accommodate the closer spacing of the two gibs and the housing extends crosswise of the saddle to accommodate the side gibs.

The upper portion of the saddle is adjusted relative to the upper guideway in the same manner as described earlier, that is, by loosening the nut 65 and rotating the micrometer adjustment screw 23 in raising or lowering direction to tilt the saddle in the required direction. It will be apparent that this motion will change the alignment of the spindle in a plane longitudinal to the path of table movement. It will be understood that this structure preserves the snug sliding fit of the saddle upon the upper guideway during adjustment and is independent, in all respects, of the lower adjustment mechanism.

The apparatus of the invention conveniently permits the operator to bring the tool spindle into position squarely at right angles to the plane of travel of the machine table, without the necessity of removing wipers or observing the precautions which are incidental to the adjustment of a common type of gib in a conventional machine, and the aligning operation is conducted in only a fraction of the time ordinarily required. By incorporating the apparatus in the saddle for adjustment of the spindle axis in a plane transverse the path of table movement, and also for adjustment in a plane longitudinal of the path of table movement, an operator conveniently may align the tool axis transversely and also tilt the axis longitudinally for chip cutting at the tool toe in roughing operations. After the roughing operation the cutter axis is readily restored to right angular alignment for the finishing cut.

Having described my invention, I claim:

1. A machine tool, comprising, a stationary member constituting a guide, a movable member supported upon said guide, gib members respectively disposed between the stationary member and the movable member along relatively opposed surfaces of the latter at an end portion thereof, and adjustable means connected in common to both of said gib members for simultaneously shifting the respective gib members in opposite directions for altering the angular position of the movable member with the stationary member.

2. A machine tool, comprising, a pair of members, each having opposed surfaces co-operable with opposed surfaces of the other, one of said members being relatively fixed and the other being relatively movable with respect thereto, gib members disposed between the co-operating surfaces of the respective fixed and movable members, at an end portion of the movable member, and adjusting means including a coordinating element connected in common to both of said gibs for simultaneously shifting the said gib members in opposite directions to adjust the alignment of the movable member with respect to the relatively fixed member without impairing its movability along the relatively fixed member.

3. A machine tool, comprising, a pair of members, each having opposed surfaces co-operable with opposed surfaces of the other, one of said members being relatively fixed and the other being relatively movable with respect thereto, gib members disposed between the co-operating surfaces of the respective fixed and movable members, a rocker arm having its endwise portions respectively engaging the gib members, a fulcrum member engaging said rocker arm substantially at a mid portion thereof between the said gib members, and means for rocking the said rocker arm, whereby the said gib members simultaneously are shifted in opposite directions.

4. A machine tool, comprising, a guide, a movable member mounted on said guide for longitudinal movement thereon, the guide having opposed parallel bearing surfaces and the movable member having surfaces overlying said parallel bearing surfaces, a pair of tapered gibs disposed longitudinally between the parallel bearing surfaces of the guide and the overlying surfaces of the movable member, the overlying surfaces of the movable member being tapered longitudinally to a degree corresponding to the taper of said gibs, the gibs having bearing surfaces parallel with the opposed parallel bearing surfaces of the guide and in bearing engagement therewith to guide the movable member during longitudinal movement upon the guide, a rocker arm having opposite end portions connected to said gibs, a fulcrum element fixed relative to the movable member and engaging the mid portion of the rocker arm for rocking movement, and adjustment means mounted relative to the movable member and connected to the gibs for shifting the same longitudinally, the rocker arm pivoting about said fulcrum element and moving said tapered gibs simultaneously in opposite directions upon actuation of said adjustment means to shift the movable member transversely relative to the guide while preserving the engagement of the bearing surfaces of the gibs relative to the opposed parallel bearing surfaces of the guide.

5. A machine tool, comprising, a guide, a movable member mounted on said guide for longitudinal movement thereon, the guide having opposed parallel bearing surfaces and the movable member having surfaces overlying said parallel bearing surfaces, a pair of tapered gibs disposed longitudinally between the parallel bearing surfaces of the guide and the overlying surfaces of the movable member, the overlying surfaces of the movable member being tapered longitudinally to a degree corresponding to the taper of said gibs, the gibs having bearing surfaces parallel with the opposed parallel bearing surfaces of the guide and in bearing engagement therewith to guide the movable member during longitudinal movement upon the guide, the gibs having end portions projecting outwardly beyond the end of the movable member, the said end portions having flange elements extending therefrom, a rocker arm having opposite end portions disposed between the end of the movable member and said flange elements and engaging the surface of the flange elements, a fulcrum element fixed relative to the movable member and engaging the mid portion of the rocker arm for rocking movement, and adjustment means mounted relative to the movable member and connected to the gibs for shifting the same longitudinally relative to the movable member, the rocker arm pivoting about said fulcrum element and moving said tapered gibs simultaneously in opposite directions upon actuation of said adjustment means to shift the movable member transversely relative to the guide while preserving the engagement of the bearing surfaces of the gibs relative to the opposed parallel bearing surfaces of the guide.

6. An adjustment mechanism for a machine tool having a guide and a movable member slidably mounted for longitudinal movement upon the guide, the guide having opposed bearing surfaces extending longitudinally thereof and the movable member having opposed gib support surfaces overlying opposed bearing surfaces of the guide; said adjustment mechanism comprising, a respective gib interposed between the opposed bearing surfaces of the guide and the gib support surfaces of the movable member, said gibs being tapered longitudinally in the same direction and having bearing surfaces parallel with the opposed bearing surfaces of the guide and slidably embracing said surfaces, the end of each of said gibs having a flange projecting therefrom and spaced outwardly from the end of the movable member, a gib housing attached to an end of the movable member and having a face wall spaced outwardly from said flanges, an elongated rocker arm disposed within said housing and having opposite end portions disposed between the flanges of the gibs and the end of the movable member and engaging the surface of said flanges, a fixed fulcrum element engaging the mid portion of the rocker arm, and a pair of screw elements passing through the face wall of the housing and engaging the surface of said flanges on the side opposite the end portions of the rocker arm, the rocker arm moving said gibs longitudinally and simultaneously in opposite directions upon rotation of said screw elements and thereby shifting the movable member transversely relative to the guide while preserving the relative spacing of the bearing surfaces of the gibs.

7. An adjustment mechanism for a machine tool having a guide and a movable member slidably mounted on the guide, the guide having opposed upper and lower bearing surfaces and the movable member having gib support surfaces overlying said bearing surfaces; said adjustment mechanism comprising, a respective gib disposed between the opposed bearing surfaces of the guide and the overlying gib support surfaces of the movable member, the gibs being tapered longitudinally in the same direction and having bearing surfaces slidably engaging the opposed bearing surfaces of the guide for lineal movement of the movable member on the guide, a gib housing attached to the movable member and having a face wall spaced outwardly from the ends of the gibs, an elongated rocker arm disposed within the housing and having end portions engaging the gibs, a fulcrum member fixed relative to the movable member and pivotally engaging the mid portion of the rocker arm, respective screw elements passing through the face wall of the housing and engaging said gibs, the rocker arm moving said gibs longitudinally in opposite directions and shifting the movable member transversely in a generally vertical plane relative to the guide upon rotation of the screw elements, counterbalance means mounted on the movable member for motion in a generally vertical plane and having lower end portions movably engaging the guide, and pressure means connecting the counterbalance means to the movable member and urging the counterbalance means downwardly under sufficient pressure to impose the major weight load of the movable member upon the guide through the counterbalance means, thereby to relieve the gibs of the said major weight load.

8. A machine tool comprising, a pair of members, each having opposed surfaces co-operable with opposed surfaces of the other, one of said members being relatively fixed and the other being relatively movable with respect thereto, respective pairs of tapered gib members mounted at opposite ends of the movable member and disposed between the co-operating surfaces of the fixed and movable members, a respective rocker arm for each pair of gib members, each rocker arm having opposite endwise portions connected to the pair of gib members, a respective fulcrum member for each rocker arm, each fulcrum member mounted relative to the movable member and connected to the rocker arm substantially at a mid portion between said gib members, and respective adjustment means mounted relative to the movable member and connected to the gib members and rocker arms at opposite ends of the movable member, said adjustment means effective to shift the gib members of each pair simultaneously in opposite directions, thereby to move the opposite ends of the movable member relative to the fixed member.

References Cited in the file of this patent

UNITED STATES PATENTS

| Number | Name | Date |
|---|---|---|
| 999,662 | Lane et al. | Aug. 1, 1911 |
| 1,100,289 | Derbyshire | June 16, 1914 |
| 2,142,114 | Criley | Jan. 3, 1939 |
| 2,589,402 | Kropp | Mar. 18, 1952 |
| 2,593,230 | Walter | Apr. 15, 1952 |

FOREIGN PATENTS

| Number | Country | Date |
|---|---|---|
| 45,973 | Sweden | Apr. 12, 1919 |